(12) United States Patent  
Kaneko

(10) Patent No.: US 12,065,594 B2  
(45) Date of Patent: Aug. 20, 2024

(54) ROLL AND METHOD FOR PRODUCING ROLL

(71) Applicant: LINTEC Corporation, Tokyo (JP)

(72) Inventor: Mayu Kaneko, Tokyo (JP)

(73) Assignee: LINTEC Corporation, Tokyo (JP)

( * ) Notice: Subject to any disclaimer, the term of this patent is extended or adjusted under 35 U.S.C. 154(b) by 25 days.

(21) Appl. No.: 16/610,220

(22) PCT Filed: May 23, 2017

(86) PCT No.: PCT/JP2017/019248  
§ 371 (c)(1),  
(2) Date: Nov. 1, 2019

(87) PCT Pub. No.: WO2018/216113  
PCT Pub. Date: Nov. 29, 2018

(65) Prior Publication Data  
US 2020/0062999 A1  Feb. 27, 2020

(51) Int. Cl.  
*C09J 7/20* (2018.01)  
*B32B 27/36* (2006.01)  
(Continued)

(52) U.S. Cl.  
CPC .............. *C09J 7/201* (2018.01); *B32B 27/36* (2013.01); *B65H 18/28* (2013.01); *C09J 7/205* (2018.01); *C09J 7/25* (2018.01); *C09J 7/38* (2018.01); *C09J 7/405* (2018.01); *B32B 2255/26* (2013.01); *B65H 2701/1722* (2013.01); *B65H 2701/1842* (2013.01); *C09J 2423/045* (2013.01); *C09J 2427/003* (2013.01); *C09J 2467/005* (2013.01); *C09J 2475/006* (2013.01); *Y10T 428/1476* (2015.01)

(58) Field of Classification Search  
None  
See application file for complete search history.

(56) References Cited

U.S. PATENT DOCUMENTS

| | | | |
|---|---|---|---|
| 11,220,091 B2* | 1/2022 | Kanda | ........................ C09J 7/22 |
| 2004/0180172 A1* | 9/2004 | Kakuta | ................... B29C 39/18 |
| | | | 428/64.4 |

(Continued)

FOREIGN PATENT DOCUMENTS

| | | |
|---|---|---|
| JP | 2005-059409 A | 3/2005 |
| JP | 2009-256395 A | 11/2009 |

(Continued)

OTHER PUBLICATIONS

JP2014065775 English Machine Translation, Aug. 18, 2023.*

(Continued)

*Primary Examiner* — Patricia L. Nordmeyer  
(74) *Attorney, Agent, or Firm* — Maier & Maier, PLLC

(57) ABSTRACT

A roll includes a core having a tubular shape and a laminate wound around the core. The laminate includes a process film, a surface coat layer formed from a fluorine resin, a (Continued)

substrate layer, an adhesive layer, and a release liner formed from polyethylene terephthalate (PET) in this order in a laminating direction. The process film is formed from at least of polyethylene terephthalate (PET), polyolefin, and polyvinyl chloride (PVC), and is thinner than the release liner.

3 Claims, 5 Drawing Sheets

(51) Int. Cl.
   *B65H 18/28* (2006.01)
   *C09J 7/25* (2018.01)
   *C09J 7/38* (2018.01)
   *C09J 7/40* (2018.01)

(56) References Cited

U.S. PATENT DOCUMENTS

| | | | |
|---|---|---|---|
| 2011/0064946 A1* | 3/2011 | Kai | C08G 18/6254 428/354 |
| 2011/0080824 A1* | 4/2011 | Kondo | B32B 7/12 369/283 |
| 2013/0034677 A1 | 2/2013 | Ujiie et al. | |
| 2013/0051888 A1 | 2/2013 | Norimatsu | |
| 2018/0094164 A1* | 4/2018 | Ito | B32B 27/32 |

FOREIGN PATENT DOCUMENTS

| | | | | |
|---|---|---|---|---|
| JP | 3174515 U | | 3/2012 | |
| JP | 2013-49815 A | | 3/2013 | |
| JP | 2014065775 A | * | 4/2014 | ......... G11B 7/24024 |
| JP | 2014-224220 A | | 12/2014 | |
| JP | 2015-196725 A | | 11/2015 | |
| JP | 2016-020079 A | | 2/2016 | |

OTHER PUBLICATIONS

Korean Office Action issued on Jan. 21, 2021, in connection with corresponding KR Application No. 10-2019-7031930 (7 pp., including machine-generated English translation).
International Search Report with English translation and Written Opinion issued on Aug. 29, 2017 in corresponding International Application No. PCT/JP2017/019248; 10 pages.
Chinese Office Action issued on Apr. 2, 2021, in connection with corresponding CN Application No. 201780090395.0 (10 pp., including machine-generated English translation).

* cited by examiner

ROLL AND METHOD FOR PRODUCING ROLL

TECHNICAL FIELD

The present invention relates to a roll and a method for producing a roll.

BACKGROUND ART

Conventionally, for example, as disclosed in JP 2016-020079 A, a laminate including a substrate layer, an adhesive layer, and a release liner has been used as a paint protection film for protecting a car body surface of an automobile, or the like, and for example, JP 2014-224220 A discloses that a surface coat layer formed from a fluorine resin is formed on a surface of a substrate layer to improve stain resistance and the like.

Such a surface coat layer can be formed by coating a substrate layer with a coating liquid containing a certain composition and curing the coating liquid. However, when a substrate layer is elongate and is wound, a surface of the surface coat layer in a soft state before sufficiently cured may become irregular or blocking (the phenomenon in which an uncured coating layer adheres to other substrate layer) may occur.

Therefore, the inventor attempted to dispose a relatively hard and tenacious process film on the surface coat layer so that the irregularities or blocking does not occur. The laminate thus produced includes a process film, a surface coat layer, a substrate layer, an adhesive layer, and a release liner in this order in a laminating direction.

However, when the present inventor wound such a laminate to prepare a roll, the release liner was distorted, for example, in a wave-like fashion, and tunneling (partial delamination) occurred between the release liner and the adhesive layer.

The present inventor thought that the cause of these problems was that a relatively hard and tenacious process film was included, the release liner was restrained accordingly, and upon expansion and shrinkage due to an environmental change in temperature or humidity or upon deformation by applying a winding pressure, the release liner could not freely expand and contract along the circumferential direction of the roll.

When tunneling occurs, a surface of the adjacent adhesive layer may be deformed according to the distortion of the release liner, and the resulting marks may remain on the surface of the adhesive layer. In a case where such marks remain in a transparent product such as a paint protection film, for example, when the film is attached to an adherend such as a car body, for example, the marks are visually recognized as a striped pattern, and the external appearance deteriorates, which is not preferable.

The present invention has been made based on novel findings by the present inventor, and an object of the present invention is to provide a roll and a method for producing a roll, which are capable of suppressing tunneling.

The roll of the present invention for achieving the above object includes a core having a tubular shape and a laminate wound around the core. The laminate includes a process film, a surface coat layer formed from a fluorine resin, a substrate layer, an adhesive layer, and a release liner formed from polyethylene terephthalate (PET) in this order in a laminating direction. The process film is formed from at least one selected from the group consisting of polyethylene terephthalate (PET), polyolefin, and polyvinyl chloride (PVC), and is thinner than the release liner.

The method for producing a roll of the present invention for achieving the above object includes forming a coating layer of a composition containing a fluorine resin on one surface side of an elongate substrate that constitutes the substrate layer, disposing the process film on the coating layer, then winding the substrate together with the coating layer and the process film, and curing the coating layer as it is to form the surface coat layer. Subsequently, the method for producing a roll of the present invention includes unwinding the substrate together with the process film and the surface coat layer, providing the adhesive layer and the release liner on another surface side of the substrate to obtain the laminate, and winding the laminate around the core to produce the roll.

ADVANTAGEOUS EFFECTS OF INVENTION

According to the roll and the method for producing a roll configured as above, restraint with respect to the release liner is alleviated, such that the release liner easily expands and contracts along the circumferential direction of the roll. Therefore, the release liner is unlikely to be distorted and tunneling is unlikely to occur between the adhesive layer and the release liner.

DETAILED DESCRIPTION OF EMBODIMENTS

Figure 1:
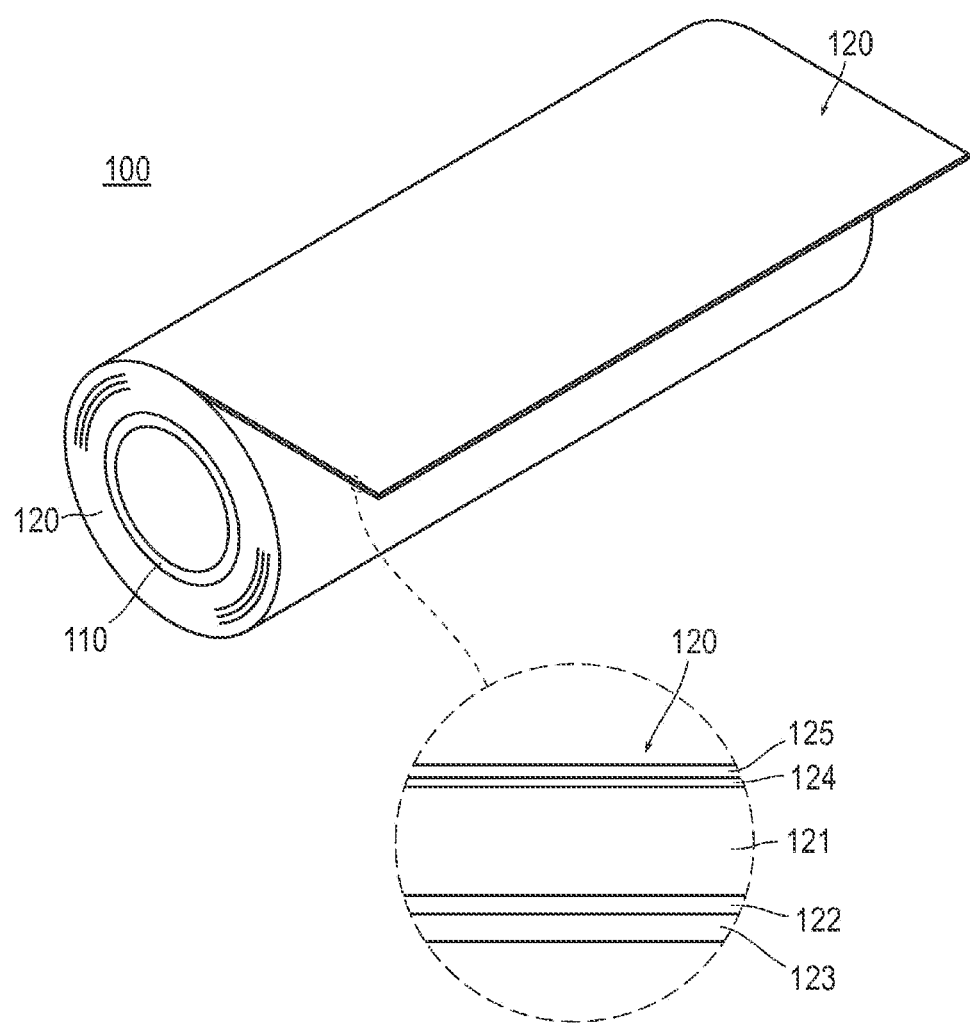
FIG. 1 is a perspective view showing a roll of a first embodiment.

Hereinafter, embodiments of the present invention will be described with reference to the attached drawings. Note that a scale ratio in the drawings is exaggerated for the convenience of explanation, and is different from the actual ratio.

First Embodiment

As shown in FIG. 1, a roll 100 of a first embodiment includes a core 110 and a laminate 120.

The core 110 has a tubular shape, an inner diameter of the core is, for example, 3 inches, 6 inches, or 11 inches, and a thickness of the core is, for example, 4 mm or more and 12 mm or less, and preferably 5 mm or more and 6 mm or less. However, the dimension is not limited thereto.

A forming material of the core 110 is a resin such as an acrylonitrile-butadiene-styrene copolymer resin (ABS) or polypropylene (PP), but is not limited thereto. The core 110 may be made of a paper tube.

The laminate 120 is elongate, but is wound around the core 110 and thus made compact. The entire length of the laminate 120 is, for example, 15 m, but is not limited thereto. The laminate 120 is used by being withdrawn from the roll 100 and cutting into a suitable size or shape.

The laminate 120 is, for example, a paint protection film to be attached to a car body surface of an automobile to protect a painted surface. However, the laminate is not limited thereto, and, for example, may also be attached to an adherend other than a car body such as a signboard, to protect or decorate the surface thereof.

The laminate 120 includes a process film 125 (CAP sheet), a surface coat layer 124, a substrate layer 121, an adhesive layer 122, and a release liner 123 in this order in a laminating direction.

The substrate layer 121 is formed from a resin having flexibility. The forming material of the substrate layer 121 is preferably polyurethane (PU), but is not limited thereto, and may also be other resins such as polyvinyl chloride (PVC), an ionomer, for example. Polyurethane (PU) has excellent flexibility, and thus is suitable for applications in which conformability to an adherend having a large number of curved surfaces is required, such as a paint protection film to be attached to a car body surface.

A thickness of the substrate layer 121 is, for example, 100 μm or more and 300 μm or less, but is not limited thereto. The flexibility of the substrate layer 121 can be enhanced by decreasing the thickness thereof, while scratch resistance can be enhanced by increasing the thickness.

The adhesive layer 122 (pressure-sensitive adhesive layer) is formed from, for example, an acrylic-based adhesive, a rubber-based adhesive, a silicone-based adhesive, a polyurethane-based adhesive, a polyester-based adhesive, or the like, but the forming material of the adhesive layer 122 is not limited thereto. In addition, these adhesives may be used alone or in combination of two or more kinds thereof. A thickness of the adhesive layer 122 is, for example, 10 μm or more and 100 μm or less, but is not limited thereto.

The release liner 123 is disposed on a surface of the adhesive layer 122 and is releasable. A release agent, such as silicone, may be applied to a surface of the release liner 123. A peel force required to peel off the release liner 123 is not particularly limited, but it is preferable that an operator can easily peel off the release liner 123 by hand. The laminate 120 is attached to an adherend in a state where the release liner 123 is peeled off and the adhesive layer 122 is exposed.

The release liner 123 is formed from polyethylene terephthalate (PET).

The release liner 123 has flexibility, but in a case where the release liner is too flexible, it is difficult to take off the release liner when peeled off by the operator.

In addition, the release liner 123 can make the laminate 120 accurately cut by supporting the laminate 120 when the laminate 120 is cut into a predetermined shape according to the adherend, but in a case where the release liner 123 is too flexible, the laminate 120 may be easily deformed by blades that are pressed, which may inhibit an accurate cutting.

Meanwhile, since the release liner 123 of this embodiment is formed from polyethylene terephthalate (PET) which is relatively hard and tenacious among the resins, the release liner is easily taken off and cutting properties of the laminate 120 is also excellent.

In addition, since the release liner 123 is formed from polyethylene terephthalate (PET) which has relatively high surface smoothness among the resins, smoothness of the adjacent adhesive layer 122 is also excellent.

Unlike this embodiment, in a case where the surface of the release liner 123 is rough, the surface of the adhesive layer 122 may also be rough accordingly. As a result, external appearance deteriorates due to the visual recognition of the roughness, which is not preferable.

Meanwhile, in this embodiment, the surface of the release liner 123 is smooth and the surface of the adhesive layer 122 has reduced roughness. Therefore, for example, even in a case of a transparent product such as a paint protection film, the external appearance is unlikely to be deteriorated.

In consideration of the easiness of taking off, cutting properties, and smoothness as described above, the release liner 123 formed from polyethylene terephthalate (PET) is used in this embodiment.

A thickness of the release liner 123 is, for example, 30 μm or more and 150 μm or less, but is not limited thereto.

The surface coat layer 124 is formed from a fluorine resin and has stain resistance. A thickness of the surface coat layer 124 is not particularly limited, but, for example, is 0.5 to 50 μm.

The fluorine resin to serve as a forming material of the surface coat layer 124 is preferably in a crosslinked form. More preferably, the forming material of the surface coat layer 124 is a cured composition containing at least one crosslinking agent selected from an isocyanate-based crosslinking agent and an epoxy-based crosslinking agent and a fluorine resin having a functional group reactive with the crosslinking agent. Such a surface coat layer 124 has excellent ductility.

Examples of isocyanate-based crosslinking agents include diisocyanate compounds including aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,2,4-trimethylhexamethylene diisocyanate, 2,4,4-trimethylhexamethylene diisocyanate, 2,6-diisocyanate methyl caproate, lysine diisocyanate, lysine ester triisocyanate, 1,6,11-undecane triisocyanate, 1,3,6-hexamethylene triisocyanate, and decamethylene diisocyanate; aromatic diisocyanates, suchastolylenediisocyanate, xylenediisocyanate, and diphenylmethane diisocyanate; and alicyclic diisocyanates, such as isophorone diisocyanate; adducts of diisocyanate compounds and polyol compounds such as trimethylolpropane; biurets and isocyanurates of diisocyanate compounds; an urethane prepolymer; and the like.

Examples of epoxy-based crosslinking agents include epoxy compounds such as N,N,N',N'-tetraglycidyl-m-xylenediamine, N,N,N',N'-tetraglycidyl-4,4-diaminodiphenylmethane, 1,3-bis(N,N-diglycidylaminomethyl)cyclohexane, 1,3-bis(N,N-diglycidylaminomethyl)toluene, and the like.

Among them, it is more preferable that the crosslinking agent is an isocyanate-based crosslinking agent because ductility is further ensured.

The crosslinking agent may be used alone or in combination of two or more kinds thereof.

Examples of functional groups in the fluorine resin having a functional group reactive with the crosslinking agent include a hydroxy group, a carboxyl group, an amino group, a glycidyl group, a cyano group, a silyl group, a silanate group, and the like. A hydroxy group is preferable from the viewpoint of crosslinkability. In this case, a hydroxy value of the fluorine resin having a functional group reactive with the crosslinking agent is preferably 5 to 200 mgKOH/g and more preferably 30 to 180 mgKOH/g. When the hydroxy value is within such a range, crosslinking reactivity and solubility in a solvent are excellent.

Examples of fluorine resins having a functional group reactive with the crosslinking agent include silicon-containing fluorine resins described in JP 2001-163927 A, JP 2001-206918 A, JP 2004-115792 A, and the like; fluorine resins described in JP 2011-121359 A and the like; and the like.

The fluorine resin having a functional group reactive with the crosslinking agent may be a commercially available product. Examples of commercially available products include Fclear series manufactured by Kanto Denka Kogyo Co., Ltd. (Fclear KD3100, Fclear KD270), Obbligato SS0062, and the like.

The fluorine resin and the crosslinking agent at the time of forming the surface coat layer 124 are preferably contained in such a content ratio that the functional group (for example, an isocyanate group) that can contribute to crosslinking in the crosslinking agent:the functional group (for example, a hydroxy group) that reacts with the crosslinking agent in the fluorine resin=5:1 to 1:10.

The process film 125 is disposed on a surface of the surface coat layer 124, makes the surface of the surface coat layer 124 before curing smooth, and prevents blocking.

In addition, the process film 125 is formed from polyethylene terephthalate (PET), similarly to the release liner 123, and has excellent smoothness. Therefore, the surface of the adjacent surface coat layer 124 has also excellent smoothness, and for example, in a transparent product such as a paint protection film, deterioration of the external appearance due to visual recognition of the roughness on the surface can be prevented.

The process film 125 is formed from the same material as that of the release liner 123, but is thinner than the release liner 123.

Next, a method for producing the roll 100 will be described.

The roll 100 is prepared, for example, by providing a surface coat layer 124 and a process film 125 on one surface side of a substrate layer 121, then providing an adhesive layer 122 and a release liner 123 on another surface side of the substrate layer 121 to form a laminate 120, and winding the laminate 120 around a core 110, but the preparation is not limited thereto.

The surface coat layer 124 is formed by curing a coating layer of a composition containing at least one crosslinking agent of an isocyanate-based crosslinking agent and an epoxy-based crosslinking agent (hereinafter sometimes simply referred to as crosslinking agent) and a fluorine resin having a functional group reactive with the crosslinking agent (hereinafter, sometimes simply referred to as fluorine resin) as described above.

Such a coating layer is formed based on a coating liquid applied to one surface side of the elongate substrate that constitutes the substrate layer 121. The coating liquid is a solution in which a fluorine resin and a crosslinking agent are dissolved in a solvent.

Specific examples of solvents contained in the coating liquid include: ester-based solvents such as ethyl acetate and butyl acetate; ketone-based solvents such as methyl ethyl ketone and methyl isobutyl ketone; alcoholic solvents such as ethanol and isopropyl alcohol; aromatic solvents such as benzene, toluene, and xylene; aliphatic saturated hydrocarbon-based solvents such as hexane, isohexane, heptane, octane, and isooctane; aliphatic solvents such as cyclohexane, methylcyclohexane and dimethylcyclohexane; chlorine-based solvents such as trichloroethylene, chloroform, m-xylene hexachloride, and the like; ether-based solvents such as acetone, diethyl ether, diisopropyl ether, and tetrahydrofuran; fluorine-based solvents such as methyl perfluorobutyl ether and ethyl perfluorobutyl ether; silicone-based solvents such as hexamethyldisiloxane, hexamethylcyclotrisiloxane, and heptamethyltrisiloxane; and the like. The solvent may be used alone or in combination of two or more kinds thereof.

A method for coating a coating liquid is not particularly limited. For example, the coating can be performed using a known coating device such as a roll coater, a knife coater, an air knife coater, a bar coater, a blade coater, a slot die coater, a lip coater, or a gravure coater.

After coating, the solvent is removed from the coating liquid by a drying treatment to form a coating layer. Drying conditions at this time are not particularly limited, and the drying is preferably performed at 60 to 150° C. from the viewpoint of solvent removal. In addition, the drying time may be suitably set up to the time that completes drying and may be, for example, about 30 seconds to 3 minutes.

In addition, a crosslinking promotor may also be used in the coating liquid. Examples of crosslinking promotors include triethylamine, N,N-dimethylcyclohexylamine, tetramethylethylenediamine, triamine, cyclic amine, dimethylethanolamine, and like alcohol amines, ether amine, and, as metal catalysts potassium acetate, potassium 2-ethylhexanote, calcium acetate, lead octylate, dibutyltin dilaurate, dioctyltin dilaurate, tin octylate, bismuth neodecanoate, bismuth oxycarbonate, bismuth 2-ethylhexanoate, zinc octylate, zinc neodecanoate, phosphine, phospholine, and the like. These crosslinking promotors may be used alone or in combination of two or more kinds thereof.

After formation of a coating layer, a process film 125 is disposed thereon. It takes time to cure a coating layer. Therefore, in consideration of production efficiency, in particular, in a case of large-scale production, before curing is completely finished, the substrate is wound together with the coating layer and the process film 125 thereon, and the resulting roll is further allowed to stand in such a state for one week or so, for example, whereby the curing of the coating layer is completed.

When winding is performed in the state where the coating layer is not sufficiently cured, the coating layer may adhere to the substrate. However, in this embodiment, since the process film 125 is disposed on the coating layer, the coating layer can be prevented from adhering to the substrate. In addition, when a surface of the process film 125 is smooth, formation of irregularity on the surface of the coating layer can be prevented.

After the curing of the coating layer is completed and the surface coat layer 124 is formed, the substrate is unwound together with the surface coat layer 124 and the process film 125. Then, on the other surface of the substrate opposite from the surface on which the surface coat layer 124 and the process film 125 are disposed, an adhesive layer 122 and a release liner 123 are provided in a usual manner.

How they are provided is not particularly limited. However, for example, it is possible that an adhesive is applied to a release liner 123 to form an adhesive layer 122, and the release liner 123 is attached to the other surface of the substrate through the adhesive layer 122, thereby providing the adhesive layer 122 and the release liner 123. Alternatively, it is also possible that an adhesive is applied to the other surface of the substrate and dried to form an adhesive layer 122, and then a release liner 123 may be attached thereto.

Next, the working effect of this embodiment will be described in contrast with a comparison.

Figure 2:
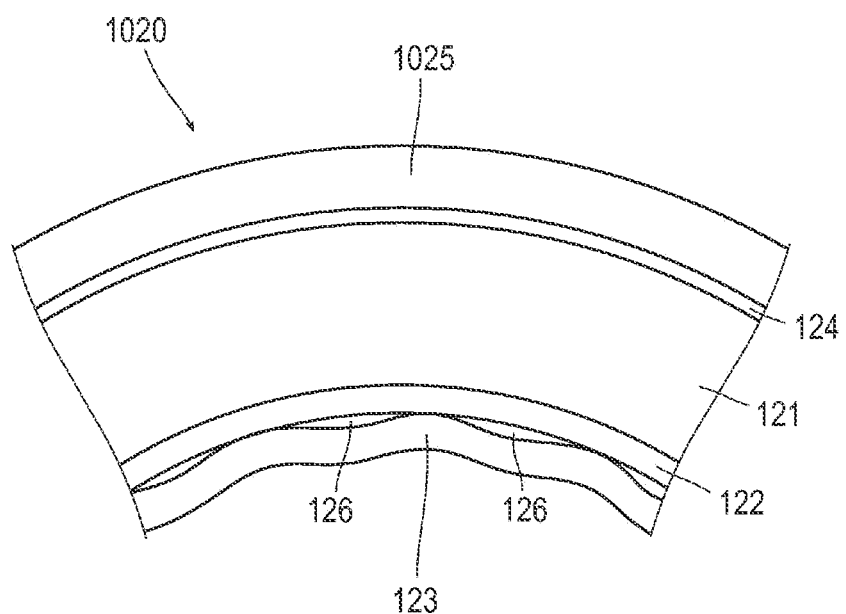
FIG. 2 is a diagram partially showing a laminate of a roll different from an embodiment.

A laminate 1020 which is a comparison shown in FIG. 2 includes a process film 1025 thicker than the process film 125 instead of the process film 125 of this embodiment. A thickness of the process film 1025 is equal to or greater than the thickness of the release liner 123, and a forming material of the process film 1025 is polyethylene terephthalate (PET).

Since such a process film 1025 is hard and tenacious, the release liner 123 is restrained by the process film 1025, and for example, upon expansion and shrinkage due to an environmental change in temperature or humidity or upon deformation by applying a winding pressure, the release liner is difficult to freely expand and contract along the circumferential direction. As a result, the release liner 123 is distorted in a wave-like fashion, and a tunneling 126 may occur between the adhesive layer 122 and the release liner 123.

Figure 3:
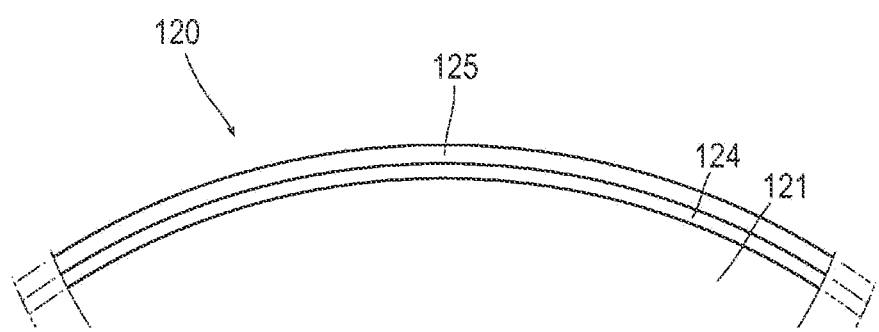
FIG. 3 is a diagram partially showing a laminate of the roll of the first embodiment.

Meanwhile, in this embodiment as shown in FIG. 3, since the process film 125 is thinner than the release liner 123 formed from the same material as that of the process film 125 and is relatively flexible, restraint by the process film 125 is alleviated, such that the release liner 123 easily expands and contracts along the circumferential direction. Accordingly, the release liner 123 is unlikely to be distorted and tunneling is unlikely to occur between the adhesive layer 122 and the release liner 123.

A forming material of the surface coat layer 124 is a cured composition containing at least one crosslinking agent of an isocyanate-based crosslinking agent and an epoxy-based crosslinking agent and a fluorine resin having a functional group reactive with the crosslinking agent, and the surface coat layer 124 has excellent ductility.

Therefore, the release liner 123 is unlikely to be restrained from the surface coat layer 124, and tunneling between the adhesive layer 122 and the release liner 123 is more effectively suppressed.

Second Embodiment

Figure 4:
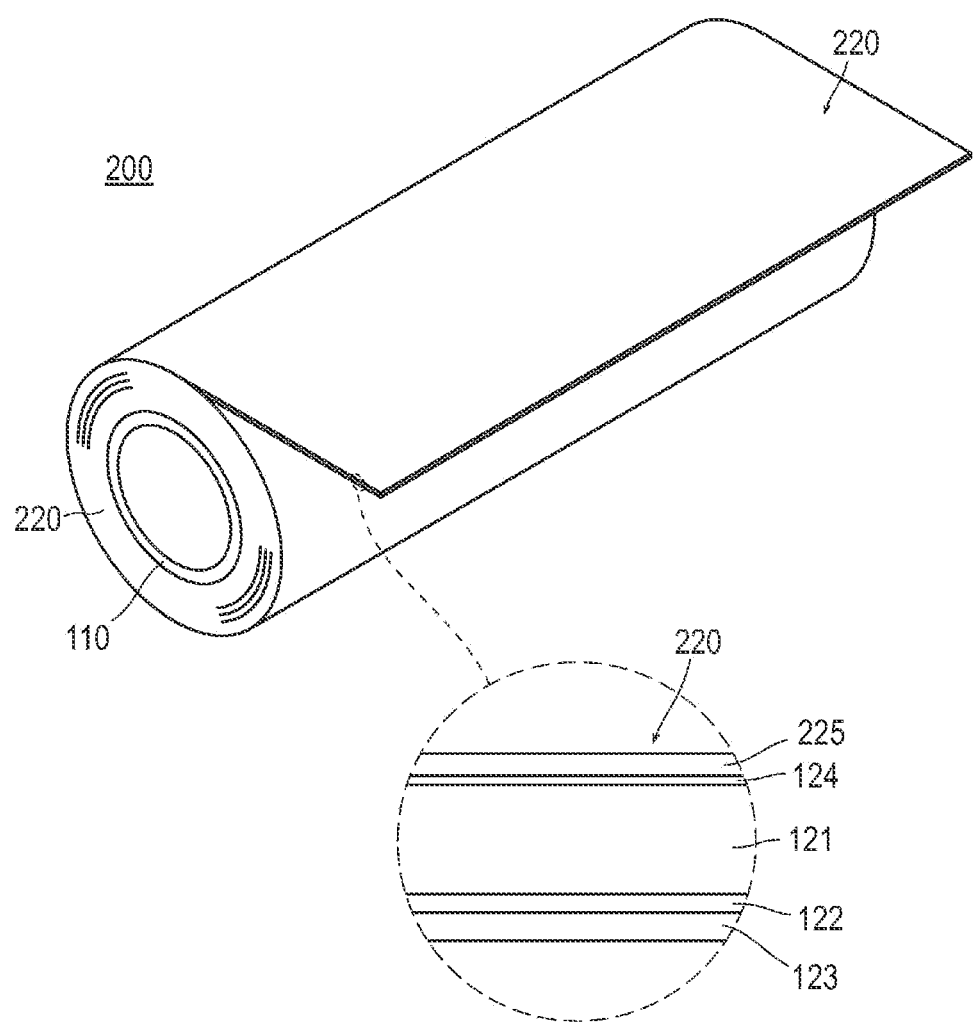
FIG. 4 is a perspective view showing a roll of a second embodiment.

As shown in FIG. 4, a roll 200 of a second embodiment has a configuration in which a laminate 220 including a process film 225 which is different from the first embodiment is wound. The other configurations of this embodiment are the same as those of the first embodiment, the same reference sign is assigned to the configuration similar to that in the first embodiment and overlapping description thereof is omitted. In addition, even in the production method, since only the process film 225 is used in this embodiment instead of the process film 125 of the first embodiment, the description thereof is omitted.

The process film 225 is formed from a material different from that of the process film 125 of the first embodiment and is formed from polyolefin or polyvinyl chloride (PVC).

Examples of polyolefins include, but are not limited to, polyethylene (PE), polypropylene (PP), polybutene (PB), polybutadiene (PBD), polymethylpentene (PMP), and the like. The polyolefin may be a drawn polyolefin or may also be an undrawn polyolefin.

In addition, the process film 225 is thinner than the release liner 123.

In this embodiment, the process film 225 is formed from polyolefin or polyvinyl chloride (PVC) and has relatively high flexibility.

Figure 5:
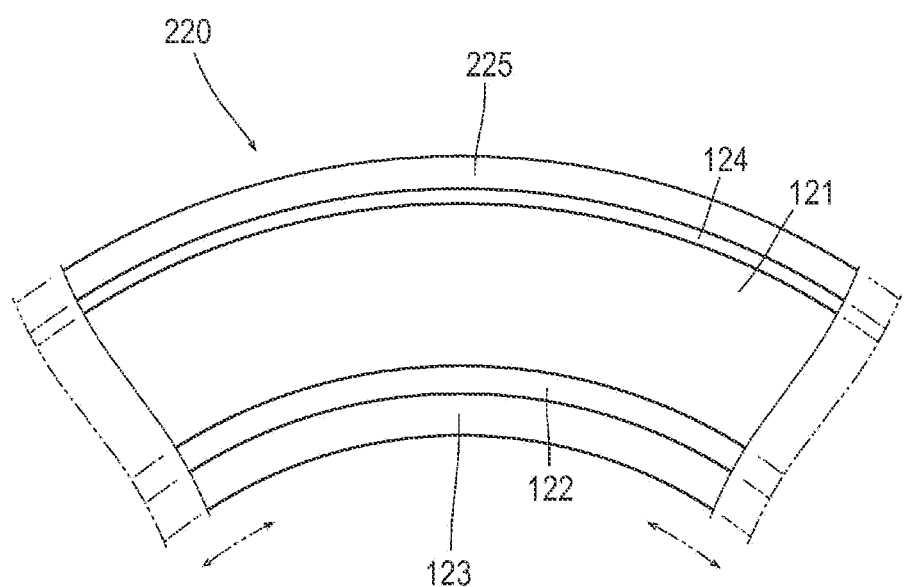
FIG. 5 is a diagram partially showing a laminate of the roll of the second embodiment.

Therefore, as shown in FIG. 5, the release liner 123 is unlikely to be restrained from the process film 225, for example, upon expansion and shrinkage due to an environmental change in temperature or humidity or upon deformation by applying a winding pressure, and similar to the first embodiment, the release liner 123 freely expands and contracts along the circumferential direction of the roll 200. Accordingly, tunneling is unlikely to occur between the adhesive layer 122 and the release liner 123.

In particular, in this present embodiment, the process film 225 is thinner than the release liner 123, which enhances flexibility of the process film 225. Therefore, restraint of the release liner 123 is further alleviated, such that tunneling is more effectively suppressed.

EXAMPLES

Figure 6:
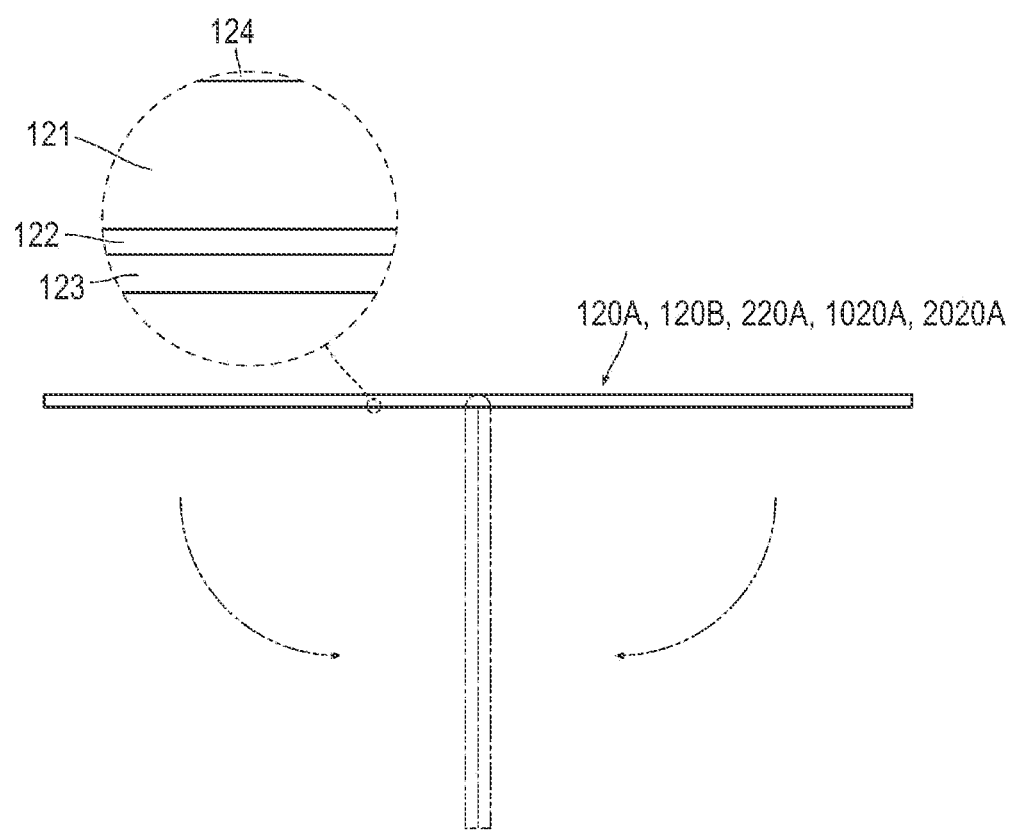
FIG. 6 is diagram showing a laminate of examples, a comparative example, and a reference example.

As shown in FIG. 6, the present inventor produced laminates 120A, 120B, and 220A of examples each having a configuration in accordance with the embodiment, and produced a laminate 1020A of a comparative example assuming the form shown in FIG. 2, as the comparison thereof, to examine that both suppression effect on tunneling and smoothness of the surface of the process film are achieved. In addition, the present inventor also produced a laminate 2020A of a reference example in which the process film was omitted from the examples, and examined the laminate 2020A with reference to only suppression effect on tunneling.

In the suppression effect on tunneling, the present inventor bent each of the produced laminates 120A, 120B, 220A, 1020A, and 2020A toward the release liner 123, and determined whether or not tunneling occurred between the adhesive layer 122 and the release liner 123 at this time, and if tunneling occurred, how much the degree of tunneling was, to evaluate the magnitude of effects.

The laminates 120A, 120B, 220A, 1020A, and 2020A each have an A4 size of 210 mm in width and 297 mm in length, and have the same configuration including the substrate layer 121, the adhesive layer 122, the release liner 123, and the surface coat layer 124. The specific configuration of respective components thereof is as follows.

The substrate layer 121 is formed from polyurethane (PU) and has a thickness of 150 μm.

The adhesive layer 122 is formed from a pressure-sensitive adhesive and is applied to the substrate layer 121 in a thickness of 40 μm.

The release liner 123 is formed from polyethylene terephthalate (PET) and has a thickness of 50 μm.

The surface coat layer 124 is formed by applying a solution in which a fluorine resin (product name: Fclear KD3100, manufactured by Kanto Denka Kogyo Co., Ltd., ethyl acetate solution having solid content of 20.3% by mass, hydroxy value: 67.0 mgKOH/g resin) having a hydroxy group and an isocyanate-based crosslinking agent (product name: Duranate D101, manufactured by Asahi Kasei Chemicals Corporation, solid content of 100% by mass, 19.7% by mass of NCO) are mixed so that OH in NCO/fluorine resin in the crosslinking agent is 1/1, to the substrate layer 121, and then performing drying at 100° C. for 5 minutes, and the surface coat layer 124 has a thickness of 7 μm.

While having the same configurations, the laminates 120A, 120B, 220A, and 1020A each have a different configuration of the process film, and the process film is omitted in the laminate 2020A of the reference example.

The laminate 120A of Example 1 includes the process film 125 formed from polyethylene terephthalate (PET), as in the first embodiment, and a thickness thereof is 25 μm.

The laminate 120B of Example 2 also includes the process film 125 formed from polyethylene terephthalate (PET), as in the first embodiment, and a thickness thereof is 12 μm.

The laminate 220A of Example 3 includes the process film 225 formed from polyethylene (PE), as in the second embodiment, and a thickness thereof is 30 μm.

In the laminate 1020A of the comparative example, the process film is formed from polyethylene terephthalate (PET), as in the process film 1025 shown in FIG. 2, and a thickness thereof is 50 µm, which is the same as that of the release liner 123.

In Table 1 below, the configurations of the process film are summarized, and the degrees of evaluation on the achievement of both suppression of tunneling and smoothness of the surface of the process film in the respective examples and the comparative example are shown. Note that only suppression effect on tunneling is evaluated in the reference example with no process film.

TABLE 1

|  | Configuration of process film |  | Achievement of both suppression of tunneling and smoothness of surface of process film |
|---|---|---|---|
|  | Material | Thickness |  |
| Example 1 (Laminate 120A) | PET | 25 µm | ◯ |
| Example 2 (Laminate 120B) | PET | 12 µm | ⊙ |
| Example 3 (Laminate 220A) | PE | 30 µm | Δ |
| Comparative Example (Laminate 1020A) | PET | 50 µm | X |
| Reference Example (Laminate 2020A) | None | None | (⊙) |

In Table 1, ⊙, ◯, Δ, and X indicate the degrees of evaluation. ⊙ indicates that the evaluation is the highest, ◯ indicates that the evaluation is the second highest, Δ indicates that the evaluation is the third highest, and X indicates that the evaluation is the lowest.

It was confirmed that the suppression effect on tunneling was excellent in all Examples 1 to 3, as compared to the comparative example, and tunneling was suppressed by the configuration in accordance with the first embodiment and the second embodiment.

The suppression effect on tunneling is relatively reduced in Examples 1 and 2 having the configuration in accordance with the first embodiment, as compared to Example 3, but polyethylene terephthalate (PET) which is a material of the process film 125 used in Examples 1 and 2 is significantly excellent in terms of smoothness.

Therefore, the smoothness of the surface coat layer 124 on which the process film 125 is disposed is also excellent and the external appearance is unlikely to be deteriorated due to the roughness on the surface of the surface coat layer 124. Accordingly, the process film 125 formed from polyethylene terephthalate (PET) is particularly preferable, for example, for a product of which appearance is important, such as a paint protection film.

In addition, in the process film 125, the flexibility thereof increases as a thickness thereof is small, and the restraint with respect to the release liner 123 is alleviated. Therefore, the suppression effect on tunneling is great as the thickness is small, but if the thickness is excessively small and flexibility is too large, the process film 125 may be easily deformed, resulting in deterioration of smoothness which is an excellent property.

Accordingly, it is preferable that the thickness of the process film 125 is suitably set in consideration of the described above, if the preferable range of the thickness (for example, 10 µm or more and 25 µm or less) based on Examples 1 and 2 in Table 1 is represented as a ratio to the thickness of the release liner 123 (50 µm), the ratio is preferably 0.2 to 0.5 and more preferably 0.2 to 0.3. By such a configuration, both smoothness and suppression of tunneling can be achieved with a particularly excellent balance.

The present invention is not limited to the embodiments and the examples described above, and can be variously modified within the scope of the claims.

For example, in the first embodiment and the second embodiment, each of the laminates 120 and 220 is wound so that the release liner 123 is disposed to a side of the core 110, but the present invention includes a form in which the front and back thereof are reversed and wound.

The invention claimed is:

1. A roll comprising:
a core having a tubular shape; and
a laminate wound around the core,
wherein the laminate includes a process film, a surface coat layer formed from a fluorine resin, a substrate layer formed only from a polyvinyl chloride (PVC) or polyurethane (PU), an adhesive layer, and a release liner formed from polyethylene terephthalate (PET) in this order in a laminating direction,
the process film is formed from polyethylene terephthalate (PET), and is thinner than the release liner, and a ratio of a thickness of the process film to a thickness of the release liner is 0.24 or more to 0.5 or less, and a thickness of the substrate layer is 100 µm or more to 300 µm or less.

2. The roll according to claim 1, wherein a forming material of the surface coat layer is a cured composition containing at least one crosslinking agent selected from an isocyanate-based crosslinking agent and an epoxy-based crosslinking agent and a fluorine resin having a functional group reactive with the crosslinking agent.

3. A method for producing a roll, comprising:
forming a coating layer of a composition containing a fluorine resin on one surface side of an elongate substrate that constitutes the substrate layer, disposing the process film on the coating layer, winding the substrate together with the coating layer and the process film, curing the coating layer as it is to form the surface coat layer; and
subsequently unwinding the substrate together with the process film and the surface coat layer, providing the adhesive layer and the release liner on another surface side of the substrate to obtain the laminate, and winding the laminate around the core to produce a roll comprising:
a core having a tubular shape; and
a laminate wound around the core,
wherein the laminate includes a process film, a surface coat layer formed from a fluorine resin, a substrate layer formed only from a polyvinyl chloride (PVC) or polyurethane (PU), an adhesive layer, and a release liner formed from polyethylene terephthalate (PET) in this order in a laminating direction,
the process film is formed from polyethylene terephthalate (PET), and is thinner than the release liner, and a ratio of a thickness of the process film to a thickness of the release liner is 0.24 or more to 0.5 or less, and a thickness of the substrate layer is 100 µm or more to 300 µm or less.

* * * * *